Figure 1:
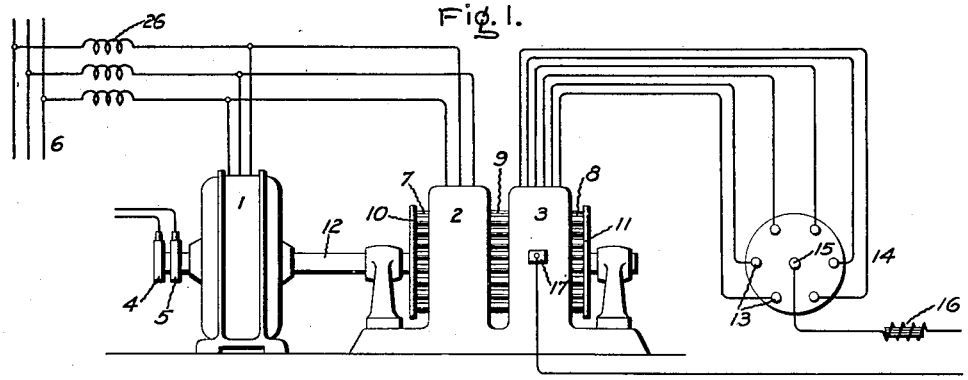

Jan. 19, 1926.  
H. M. HOBART  
CONVERTER SYSTEM  
Filed March 17, 1922

1,570,347

Inventor:  
Henry M. Hobart,  
by Alexander Davis  
His Attorney

Patented Jan. 19, 1926.

1,570,347

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

CONVERTER SYSTEM.

Application filed March 17, 1922. Serial No. 544,553.

*To all whom it may concern:*

Be it known that I, HENRY M. HOBART, a citizen of the United States, residing at Schenectady, in the county of Schenectady, State of New York, have invented certain new and useful Improvements in Converter Systems, of which the following is a specification.

My invention relates to the conversion of alternating current into direct current and to the conversion of alternating current of one frequency to an alternating current of a different frequency.

One characteristic attribute of my invention relates to an intermediate transformation of the electricity in the polyphase form into electricity of a frequency much higher than the frequency of the supply circuit. Another characteristic relates to the inclusion of means for providing control of the phase of the electricity consumed by the apparatus with the object of eliminating the necessity for ever consuming a lagging current which is so well known to exert a deleterious effect on electricity supply systems, and to almost always be economically undesirable. This characteristic is allied to the provision of features of voltage control of the D. C. output. Other advantages will appear as the description proceeds.

In the use of mercury arc rectifiers it is an advantage to supply them with a high frequency so that the pulsations in the direct current can be smoothed out with smaller and less expensive and more efficient reactors than would be the case with normal frequency. The subdivision of the current supplied to the rectifier into a large number of phases also contributes to obtaining a steady direct current adequately free from pulsations. These two means are to a certain extent interchangeable and by increasing the frequency an equally good result can be obtained with a decreased number of phases and vice versa. If, in my invention, I sufficiently increase the frequency, it will sometimes be practicable to sacrifice a portion of the advantage in the matter of improved quality of the direct current electricity, in the interests of simplifying the apparatus in other respects, by decreasing the number of phases. I consider, however, that it is usually desirable to have a liberal number of phases even with the high frequency which I employ. I consider it necessary to provide a direct current quite as free from pulsations and quite as incapable of occasioning telephone disturbances as has been obtained with the best synchronous converters heretofore and at present so widely used for providing direct current electricity when supplied from a polyphase source. Also, when it is desired to operate a mercury arc rectifier from an existing 60 cycle polyphase supply, it is rarely the case that the alternating current voltage is such as to give the desired direct current voltage from the rectifier without interposing a transformer to step down the voltage. It is consequently very desirable that the transformer which is necessary to interpose shall transform three characteristics, namely, the voltage, the number of phases and the frequency. The desired large number of phases, if for example, twelve or more, can be much more simply obtained by means of cylindrically distributed windings in a rotating machine than in a stationary transformer of the usual three-legged type. In my invention I employ rotating elements in which transformation is made of the voltage, the number of phases and the frequency of the current supplied to the anodes of the rectifier. While for the sake of simplicity, I show in one of my examples only six phases supplied to the rectifier and in another example twelve phases, the desirability of a reasonably large number of phases, will usually lead to employing twelve phases and sometimes a still greater number.

Figure 3:
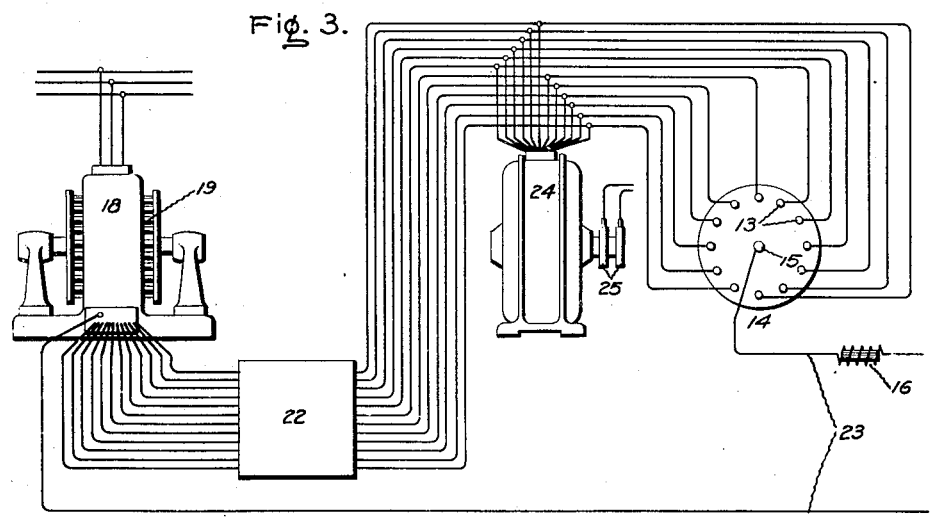
Figure 4:
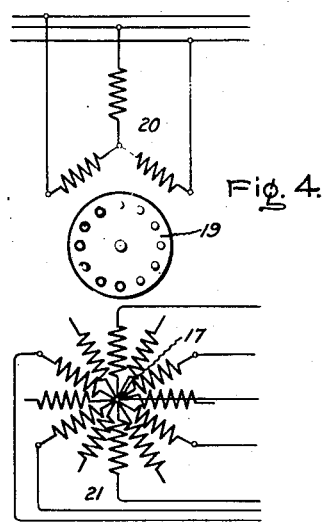
Figure 2:
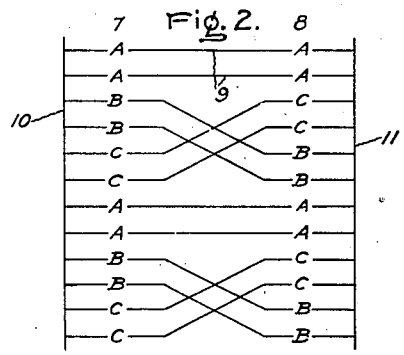

The features of my invention which I believe to be novel and patentable will be pointed out in the claims appended hereto. The details of construction and operation of my invention will be described in connection with the accompanying diagrammatic illustrations, in which Fig. 1 shows one form of my invention employing a synchronous motor driven frequency and voltage changer and phase multiplier supplying a rectifier; Fig. 2 shows the preferred arrangement of the rotor windings of such a machine; Fig. 3 shows a single asynchronous machine for increasing the frequency and multiplying the number of phases and using a synchronous condenser for regulating the direct current voltage of the rectifier and supplying the magnetizing current for the frequency changer, and Fig. 4 illustrates the windings of the type of machine shown in Fig. 3.

Referring now to the drawings and in particular to Fig. 1, 1, 2 and 3 are stators provided with the usual type of alternating current windings. 1 is the stator of a synchronous motor whose rotor carries field coils into which direct current is carried by means of collector rings 4 and 5 from any suitable source, for example, the direct current end of the converting system. The windings on stators 1 and 2 may be considered to be supplied from a 60 cycle source of polyphase electricity over the transmission line 6. The rotors 7 and 8 corresponding to the stators 2 and 3 have squirrel cage bars 9 in common. These squirrel cage bars terminate in end rings 10 and 11 located respectively at the left hand end of rotor 7 and at the right hand end of rotor 8. Two of the three conductors supplying the stator 2 are reversed in comparison with the corresponding conductors supplying the stator 1 and as a result, the magnetic field in stator 2 rotates in the opposite direction to the magnetic field in stator 1 and also opposite to the direction of mechanical rotation. For the purpose of explanation it will be considered that the stators 1, 2 and 3 all have bipolar windings, in which case the shaft 12, which is driven by the synchronous motor 1, will rotate at 3600 R. P. M. The magnetic field in stator 2 induces in the conductors of its rotor a frequency of 120 cycles. By a crossing over of two-thirds of the squirrel cage bars in passing from rotor 7 to rotor 8, (see Fig. 2) the direction of rotation of the magnetic field induced in stator 3 by the rotor 8 is made the same as the direction of mechanical rotation. Consequently, there is induced in the bipolar windings of stator 3 a frequency of 180 cycles per second.

The apparatus comprising the motor 1, stators 2 and 3 and the rotor element comprising squirrel cages 7 and 8 constitutes in itself a novel method of increasing the frequency of alternating currents and is claimed in a divisional application, Serial No. 741,744, filed October 4, 1924. It will be evident that by varying the relation of the numbers of poles in the three machines 1, 2 and 3 a variety of frequency changing ratios may be had. Also by making the phase rotation of stator 2 the same as the direction of mechanical rotation but of a different speed, the machine may be utilized as a frequency reducer in any desired ratio as determined by the ratio of pole numbers. Furthermore the rotor need not necessarily have a squirrel cage but may be provided with a form wound induction winding if desired. The windings on stator 3 are preferably star connected but may be connected in any other manner so as to obtain a neutral point and for the purpose of explanation a 6-phase winding is represented. This 6-phase winding may be wound for the desired voltage and supplies the six anodes 13 of a vapor valve, for example, a mercury arc rectifier 14 whose cathode is represented at 15. This type of rectifier is well known and its operation may be considered as the action of a vapor brush rotating in synchronism with the frequency supplied thereto so that the current always flows between the cathode and the anode which is positive with respect thereto. In series with the cathode, with the object of reducing the amplitude of the high frequency pulsations caused in the direct current due to the shifting of the arc from one anode to another, is a reactor 16 which can be of relatively small size for accomplishing this purpose because the frequency of the pulsations is three times as high as would have been the case if the three-fold multiplication of the frequency had not been employed. The other side of the direct current circuit is supplied from the neutral point 17 of the winding on the stator 3. The arrangement already referred to whereby two-thirds of the rotor bars 9 are crossed over in going from rotor 7 to rotor 8 is illustrated diagrammatically in Fig. 2 where the bars of phase A of the rotor are carried straight through from one end ring to the other end ring without any cross-over, and the bars of phases B and C are exchanged in their positions. It will be seen that while at the left of Fig. 2 corresponding to rotor 7, the order of the phases is A, B, C; on the right hand side corresponding to rotor 8, the order of the phases in C, B, A; that is to say, the direction of rotation of the magnetic field has been reversed.

It is not necessary to employ bipolar windings for the machines 1, 2 and 3. If a frequency higher than three times supply frequency is desirable, the numbers of poles for which the stators 2 and 3 are wound can be made 4 or more. High speed is usually associated with low cost and high efficiency and consequently two poles is preferred for the synchronous motor, but if for any suitable reason a lower speed is desired, this machine can be built with four or more poles. In the example which I have used for the purpose of explanation, and assuming 100% efficiency for the outfit, for every 100 kilowatts delivered from the winding on the stator 3 there will be drawn 66⅔ kilowatts from the line 6 into the windings located on stator 1 and 33⅓ kilowatts will be drawn from the line into the windings located on stator 2.

In order to obtain a regulation of the direct current voltage delivered from the mercury arc rectifier, I arrange that current from the 60 cycle supply line 6 shall first pass through a suitably dimensioned polyphase reactor 26 so that by adjusting the excitation of the field of the synchronous motor 1, the direct current voltage at the terminals of the outfit shall be varied; thus increasing the field excitation will tend to increase the direct current voltage, while decreasing the field excitation will tend to decrease the direct current voltage. This is one of the very desirable attributes of the outfit as compared with a stationary transformer for supplying a mercury arc rectifier. With the latter type of outfit the stationary transformer would have to be supplemented by a rather expensive induction regulator to permit of the regulation of the direct current voltage. The synchronous motor 1 must be liberally and specially proportioned to provide the requisite phase control.

The squirrel cage winding 9 on the rotors 7 and 8 may be made of such exceedingly low resistance that the losses in it will be only a fraction of 1% of the input to the apparatus.

In Fig. 3 I show another embodiment of my invention. 18 is the stator and 19 is a low resistance squirrel cage rotor of a machine physically similar to an ordinary squirrel cage induction motor except that on the stator are two independent windings 20 and 21 (see Fig. 4) wound for two different non-interfering pole numbers. For the purpose of explanation winding 20 may be wound for two poles while winding 21 is wound for eight poles. Neglecting slip this provides a frequency transformation of 1 to 4 and if the winding 20 is supplied from a 60 cycle circuit, I shall obtain a frequency of 240 cycles from the terminals of winding 21. I also at the same time by suitably proportioning the number of turns in the windings 20 and 21, transform the voltage from that of the 60 cycle circuit to that desired for supplying the mercury arc rectifier. I also multiply the phases from the three phases corresponding to the supply circuit and the bipolar winding 20 to a larger number of phases for the 8-pole winding 21. For illustrative purposes I show 12 phases for the winding 21. This machine thus provides simultaneous transformation of the voltage, the number of phases and the frequency. In operation winding 20 and squirrel cage 19 operate as an induction motor while the rotor 19 and winding 21 operate as an asynchronous generator. The actual frequency obtained will be something slightly less than 240 cycles due to the slip necessary for the induction action. The high frequency 12 phase current obtained from winding 21 is next taken through a reactor diagrammatically represented at 22 similar in construction to the reactor 26 of Fig. 1 except wound for a different number of phases and proportioned for a different frequency. From the reactor 22 the 12 phases are led to the 12 anodes 13 of the mercury arc rectifier 14. One side of the direct current circuit 23 is fed from the cathode 15 of rectifier 14 through a reactor 16 employed to decrease the amplitude of the pulsations in the direct current. The 12 phase 8-pole winding 21 is star connected and the other side of the direct current circuit is supplied from the neutral point 17 of the star.

A frequency changer of the type described requires to be operated in conjunction with a synchronous condenser, or other synchronous machinery for supplying magnetizing current. At 24 I have shown a 12-phase synchronous condenser connected in shunt to the 12-phase line between the reactor 22 and the rectifier 14 and provided with starting means such as a small induction motor not shown. By varying the strength of the direct current excitation supplied to the rotor of the synchronous condenser through slip rings 25 from any suitable source, I can control the value of the direct current voltage supplied from the rectifier, and, in fact, this control may be made automatic by the installation of a voltage regulator controlling the field excitation of the synchronous condenser. The reactor 22 being for 240 cycles will be much smaller and cheaper and will have less losses in it than would be the case with a 60 cycle reactor. Furthermore, the reactor 16 in the direct current circuit for decreasing the amplitude of the pulsations, will also be relatively small, since the pulsations will be of very high frequency, due to the combined effect of the large number of phases and the high frequency. I have taken 12 phases for the high frequency winding of the frequency changer, but any other large number of phases may be used. Furthermore, instead of only having one star connected winding on the stator of the frequency changer for supplying the rectifier, I may have several independent star connected windings, each supplying a rectifier or rectifiers and each having its own synchronous condenser. As an alternative several independent systems obtained from a plurality of windings on the frequency changer may be controlled by a single synchronous condenser, either by having a number of independent windings on the stator of the synchronous condenser, or else integrating them all by means of a transformer with several primary windings and a single secondary winding, the secondary winding going through a reactor used for voltage control on the way to the synchronous condenser. If I fit the synchronous condenser with a star connected winding, the neutral point may serve for the direct current terminal in place of the neutral point 17 of the winding 21 of the frequency changer, in which case, should it be desired, the winding 21 may be of the mesh type.

Since there are no moving contacts in the frequency changer, no step-down transformer is required between it and the alternating current supply line unless the voltage of the supply line is very high, and indeed if the system voltage is sufficiently high, the windings 20 and 21 may be enclosed in oil in an annular tank in which may be located cooling coils through which water may be circulated. A conservator tank may be added to the system. Since the squirrel cage rotor may readily be built to have a smooth cylindrical surface and smooth ends, the friction will not be prohibitive if the entire frequency changer is immersed in oil. In this case the rotor should be designed of small diameter.

It is obvious that the regulation obtained by the reactance 26 and the synchronous motor 1 in Fig. 1 and by the reactance 22 and synchronous condenser 24 in Fig. 2 might be obtained by the use of static condensers and I might make the reactance variable instead of the condensers.

What I claim as new and desire to secure by Letters Patent of the United States, is:

1. In combination a vapor rectifier having a plurality of anodes and a common cathode, a polyphase winding having its phases symmetrically connected to said anodes, a direct current circuit supplied from a neutral point of said winding and said cathode, an induction rotor for generating an alternating current in said winding, and means supplied from an alternating current source of a lower phase and frequency than said winding for rotating said induction rotor and inducing a current therein.

2. In combination a vapor rectifier having a plurality of anodes and a common cathode, a commercial alternating current supply circuit, rotating apparatus provided with separate polyphase stator windings and a common squirrel cage rotating element for transforming the phase, frequency and voltage of said alternating current circuit, one of said stator windings being connected to said alternating current circuit and the other of said windings being provided with a greater number of phases symmetrically connected to the anodes of said rectifier, and a direct current circuit supplied from the cathode of said rectifier and a neutral point of said last mentioned winding.

3. In combination a vapor rectifier having a plurality of anodes and a common cathode, a commercial alternating current supply circuit, rotating apparatus provided with separate polyphase stator windings and a common induction rotating element for transforming the phase, frequency and voltage of said alternating current circuit, one of said stator windings being connected to said alternating current circuit and the other of said windings being provided with a greater number of phases than said first mentioned winding symmetrically connected to the anodes of said rectifier, a direct current circuit supplied from the cathode of said rectifier and a neutral point of the greater phase winding, and a reactor and condenser one of which is adjustably connected in circuit between said alternating current supply circuit and said rectifier for regulating the phase of said alternating current circuit and the voltage of said direct current circuit.

4. In combination a vapor rectifier having a plurality of anodes and a common cathode, a commercial alternating current supply line, rotating apparatus provided with separate polyphase stator windings and a common squirrel cage rotor element for transforming the phase, frequency and voltage supplied thereto from said alternating current line, one of said stator windings being connected to said alternating current line and the other of said windings being connected in star and provided with a greater number of phases than said first mentioned winding symmetrically connected to the anodes of said rectifier, a direct current circuit supplied from a cathode of said rectifier and the neutral point of said star connected winding, and a reactor and a synchronous condenser connected in circuit between said alternating current supply line and said rectifier for regulating the phase of said alternating current circuit and the voltage of said direct current circuit.

5. The method of converting commercial alternating current into direct current which consists in simultaneously transforming the phase, frequency and voltage of said alternating current to an alternating current of a higher frequency and phase and a voltage suitable for rectification, by means of rotating apparatus, symmetrically supplying said transformed alternating current to the anodes of a polyphase vapor rectifier, and drawing off direct current from a common cathode of said rectifier and a neutral voltage point in the transformed alternating current system.

6. A system of conversion using a vapor rectifier comprising in combination a source of commercial frequency alternating current, a synchronous motor supplied thereby, a double stator frequency increaser and phase multiplier having a common rotor element driven by said motor, said rotor being fitted with a system of induction conductors, a portion of which are crossed over between the two stators so as to reverse the phase rotation of the currents induced therein, one of said stators being provided with a winding supplied from said alternating current source so as to have a phase rotation opposite to the direction of rotor rotation and the other of said stator windings being provided with a neutral point and a plurality of phases the latter being symmetrically connected to supply the anodes of a polyphase vapor rectifier, a common cathode for said rectifier and a direct current circuit supplied from said cathode and the neutral point of said last mentioned winding.

7. A system of conversion comprising in combination a source of commercial alternating current, a synchronous motor supplied thereby, a double stator frequency increaser and phase multiplier having a common rotating element driven by said synchronous motor, said rotor comprising a system of squirrel cage conductors, a portion of the conductors of which are interchanged between the two stators so as to reverse the phase rotation of the currents therein with respect to the two stators, one of said stators being supplied from said alternating current source so as to induce in its portion of the squirrel cage rotor a magnetic field rotating opposite to the direction of mechanical rotation, a neutral connected winding of a greater number of phases on said other stator, a vapor rectifier having a plurality of anodes supplied from said winding, a direct current circuit supplied from a cathode of said rectifier and the neutral point of said winding and a reactor in series with said synchronous motor whereby the phase of the alternating current circuit and the voltage of the direct current circuit may be varied by varying the excitation of said synchronous motor.

In witness whereof, I have hereunto set my hand this 16th day of March, 1922.

HENRY M. HOBART.